United States Patent [19]
Hills

[11] 3,943,956
[45] Mar. 16, 1976

[54] HYDRAULIC GOVERNORS
[75] Inventor: Richard Hills, Baldock, England
[73] Assignee: Borg-Warner Limited, Letchworth, England
[22] Filed: June 13, 1973
[21] Appl. No.: 369,631

[30] Foreign Application Priority Data
July 6, 1972  United Kingdom............... 31174/72

[52] U.S. Cl. ................................................. 137/56
[51] Int. Cl.² ......................................... G05D 13/10
[58] Field of Search ......................................... 137/56

[56] References Cited
UNITED STATES PATENTS
| | | | |
|---|---|---|---|
| 3,566,894 | 3/1971 | Satoh | 137/56 X |
| 3,799,183 | 3/1974 | Shoichi | 137/56 |

*Primary Examiner*—Robert G. Nilson
*Attorney, Agent, or Firm*—Robert L. Zieg

[57] ABSTRACT

An hydraulic governor for automatic transmissions relying on derivation of a pressure varying with rotational speed over a relatively wide range, by balancing an hydraulic pressure against a centrifugal force-operated load.

2 Claims, 3 Drawing Figures

HYDRAULIC GOVERNORS

SUMMARY OF INVENTION

Centrifugal type fluid pressure controlling governors are commonly used in automatic transmission applications where varying output hydraulic pressures may be desired for controlling different speed ratios of the transmission in response to changes of the speed of rotation of an element of the transmission. In operation, substantially constant input or line fluid pressure, provided by a pump, is metered through a valve urged outwardly by centrifugal force. The metered fluid pressure is imposed upon a portion of the valve to oppose the centrifugal force on the valve so that the outlet pressure of the governor represents the fluid pressure necessary to oppose and balance the centrifugal force upon the valve and, accordingly, in such valve, the governor outlet pressure varies directly with the centrifugal force on the valve.

Since centrifugal force imposed on an element mounted eccentrically of a rotated shaft varies directly as the square of the speed of rotation, the outlet pressure of the ordinary centrifugal governor, mounted on the shaft, varies directly as the square of the speed of rotation of the governor valve body, and a fluid pressure necessary to balance this centrifugal force would likewise vary in pressure according to the square of the speed producing a parabolic curve on a chart of pressure vs. speed. As a result, a governor arranged to provide a substantial, usable rate of increase of pressure with increase in rotational speed for a relatively slow speed is ineffective to control ratio changing at higher speeds because the outlet pressure of the governor reaches the line fluid pressure before the entire shift speed range has been traversed. Conversely, a governor arranged to provide a substantial, usable rate of increase of fluid pressure with increase in rotational speed in the high speed range is not usable in the low speed range because of the very low rate of change of fluid pressure in this range. In addition, it is frequently desirable to provide a governor having three performance stages including the ability to control a speed range intermediate between the low and high speed ranges and incompatible therewith because of the fluid pressure differential existing between these ranges. In such case, it is necessary to provide an hydraulic governor characterized by the pressure developed thereby, due to the rotatable shaft speed, being capable of varying in three stages.

Governors of the three-stage type, used in the past, may consist of two or more separate governors for providing different speed ranges with each governor usually requiring an individual centrifugal weight, valve, and springs, exactingly formed, precisely calibrated, and correctly assembled for insuring performance. While less expensive single three-stage governors have been proposed, such governors are complex and complicated as they usually require two or more valves, and have multiple centrifugal weights and rated springs to operate the valves, with the valve body having multiple parts accurately bored to provide pressure fluid conduits and ports and also passages to slidably mount the operating movable components of the governor.

The present invention provides an improved hydraulic governor of compact assembly and of simplified construction having a single valve actuatable by springs operable by a pair of successively centrifugal force-operated telescoping weights within the valve to meter fluid pressure on the valve and opposed by the centrifugal force on the valve.

IN THE ACCOMPANYING DRAWINGS

Figure 1:
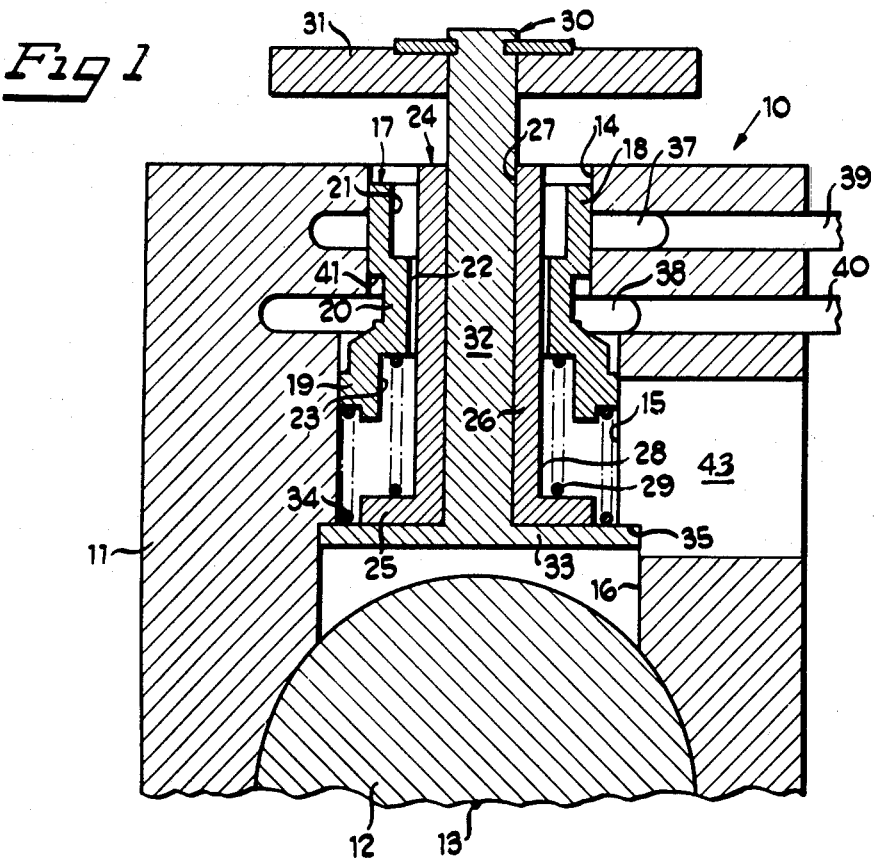
FIG. 1 is a cross-sectional view of a three-stage hydraulic governor embodying the invention.

Referring now to FIG. 1, the illustrated centrifugal type fluid pressure governor of the present invention is generally designated by the reference numeral 10. The governor 10 comprises a body or housing 11 which may be formed as a single casting or as a two-piece assembly fixed to a member or shaft 12 both of which are rotatable about the central axis 13 of the shaft 12. The shaft 12 may be driven by any rotatable portion of a transmission or the like (not shown) with which the fluid outlet pressure from the governor is to be correlated. The housing 11 is formed with a bore provided by connected cylindrical cavities 14, 15 and 16 of respectively smaller diameters as they extend radially outward at right angles with respect to the axis 13. Due to this fact, it will be apparent that the cavities can be readily formed to provide smooth cylindrical surfaces engaging the valve and a centrifugal weight assembly.

This assembly comprises a movable regulating valve element or member in the form of a valve piston or spool 17 disposed within and slidably engaging the cylindrical surfaces of the connected cavities 14 and 15 of the housing, the spool having lands 18 and 19 respectively within the cavities 14 and 15 and also having a groove 20 between the lands 18 and 19. The spool is hollow and is provided with central cylindrical cavities 21, 22 and 23 having stepped diameters.

The valve and weight assembly includes a weight member 24 for moving the spool 17 under the influence of centrifugal force. The weight member 24 comprises a tubular element or member including a connected head portion 25 and stem portion 26 having cylindrical inner and outer surfaces 27 and 28. The stem portion 26 of weight member 24 extends through the valve spool 17 and its outer surface 28 slidably engages the surface of the cylindrical cavity 22 of the spool 17. A spring member in the form of a coil spring 29 surrounds the stem portion 26 of weight member 24 and has one end extending into the cylindrical cavity 23 of the spool 17 to engage the spool and has its other end seated on the head portion 25 of the weight member 24.

The valve weight assembly also includes a weight member 30 for moving the valve spool 17 under the influence of centrifugal force. The weight member 30 comprises a weight 31 located exteriorly of the housing 11 and connected by means of a rod or stem 32 with another smaller weight 33 located within the cavity 16 of the housing 11 and engaging the cylindrical surface of the cavity 16. The rod 32 extends through the hollow weight member 24 and slidably engages the inner cylindrical surface of the weight member 24. A spring member in the form of a coil spring 34 extends between and has its opposite ends respectively engaging the weight 33 and the valve spool 17.

The governor body or housing 11 is provided with a fluid pressure supply or inlet port 37, a fluid pressure outlet or discharge port 38 and an exhaust port 43. The port 37 is connected with a passage or conduit 39 carrying fluid under substantially constant pressure (hereinafter denoted "line pressure") supplied to the valve cavity 14 of the housing 11 and thereby to land 18 of valve spool 17. The port 38 is connected to the valve body "governor" or outlet pressure passage or conduit 40 so that pressure fluid admitted to the port 37, through the cracked pressure-regulating spool 17, can be conducted to the particular pressure fluid-operated device of the transmission.

Figure 2:
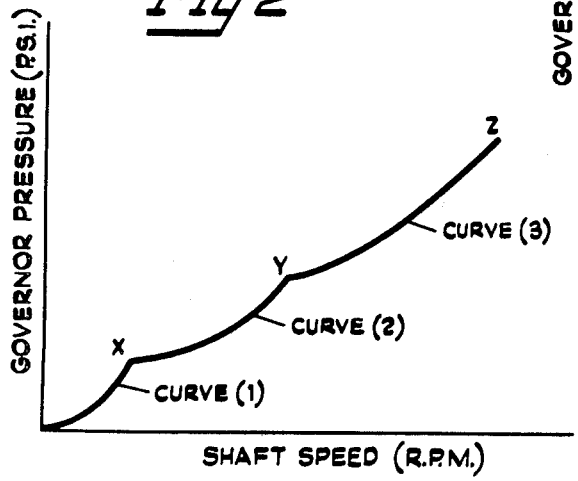
FIG. 2 is a graph illustrating the output pressure provided by the governor valve of FIG. 1 as a function of the speed of revolution.

Initially, the hydraulic governor is rotated at very low speeds so that the valve spool 17 will move outwardly due to the centrifugal force of the spool and assisted by the force of the effective mass of the weight members 24, 30 and the mass of springs 29 and 34 to regulate the line pressure by the valve speed metering the line pressure from port 37 to port 38 to develop governor pressure. As the speed of rotation of the governor increases, the weight members 24 and 30 continue to move radially outwardly to compress springs 29 and 34 providing a further assisting source to that of the valve spool 17 until the radially outward movement of the weight member 30 causes its weight 33, as shown in FIG. 1, to engage stop means in the form of an annular shoulder 35 of the casing 11 to prevent further outward movement of the weight member 30. At this time, the spring 34 causes a constant pressure to be exerted on the valve spool. In this first stage of operation by the governor, the governor pressure, developed by the governor valve and weight assembly, rises at a gradually uniform rate as indicated by curve (1) extending from zero to point X on the chart of FIG. 2. It will be understood that in all stages of governor operation the valve spool 17 reciprocates through a relatively short range of movement from a position opening the inlet port 37 to a position opening exhaust port 43.

In the operation of the hydraulic governor in the present invention, the valve body conduit 39 is connected to a source of pressurized fluid which, in the case of an automobile power transmission, is usually a pump driven by the transmission torque converter at engine speed. The pump is effective to pressurize conduit 39 with a fluid under substantially constant pressure to provide line pressure regardless of the operating speed of the pump.

In the second stage of regulation by the governor, the governor rotation is accelerated and, as a result, weight member 24 is thrown further radially outward to additionally compress spring 29 and engage the upper end of the stem 26 of the weight member 24 with stop means provided by the weight 31 of the weight member 30 so that, at the end of the second stage, there is a further assisting constant force by the spring 29 to the spool 17. In the second stage of regulation by the governor, it will be apparent that, as the governor rotates about the output shaft 12, the pressure in conduit 40 increases at a rate determined by the effect of the centrifugal force on the mass of the valve 17 and on the weight members 24 and 30, which centrifugal force is augmented by the constant pressures of the springs 29 and 34. Thus, as the governor rotates about shaft 12, these forces, moving the valve spool 17 outwardly, determine the hydraulic pressure required to move the valve spool inwardly to meter the line pressure fluid from port 37 to port 38. During this second stage, the metered pressure fluid, developed by movement of the valve spool, as indicated by curve (2), increases from point X to the point Y on the chart of FIG. 2.

The third stage of regulation of governor pressure is achieved by line pressure from port 37, acting on the relative small and large surface areas 41 and 42 of the spool 17 overcoming or counteracting the combined constant forces of the springs 29 and 34 and centrifugal force of the valve spool 17. During this third stage, the pressure rises at a different rate than in stages one and two, as indicated by the curve (3) extending from the point Y to point Z of the chart of FIG. 2.

Figure 3:
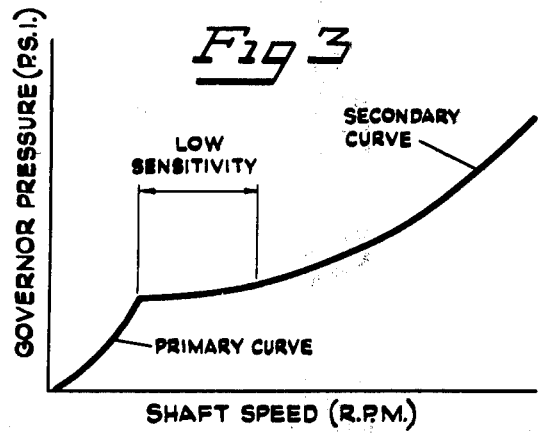
FIG. 3 is a graph illustrating the output pressure provided by a conventional two-stage governor as a function of speed revolution.

FIG. 3 is a chart illustrating the characteristic of a conventional two-stage governor and which shows that the performance curves take a parabolic form and, as such, at the lower operating speed ranges, shows an area of low sensitivity exists (pressure vs. R.P.M.). Attempts to increase this sensitivity or to offset its effect have been made in two-stage governor development to give greater definition between extreme shift points. Generally, with regard to three-speed transmissions, the minimum 1–2 shifts occur on the primary curve and the minimum 2–3 shifts on the secondary curve. With the advent of higher operating speeds, the area of low sensitivity will extend, assuming the present upshift pressure schedules into top gear are maintained, thus making more apparent the problem of shift point discrimination. This acute problem becomes apparent with the introduction of a fourth speed ratio. The governor of the present invention solves this problem, as will be apparent from the chart of FIG. 2, with the addition of a secondary weight system 24 which provides a third stage (for the third to fourth speed shift) to the generally accepted governor curve of the FIG. 3 chart, and, in so doing, increases the sensitivity at the lower speed ranges.

What is claimed is:

1. An hydraulic governor comprising a member rotatable about an axis, and a valve and weight assembly rotatable about the axis of said member and including a movable regulating valve element slidably disposed in said rotatable member, said rotatable member having a fluid pressure supply port and also a fluid pressure discharge port in communication with said valve element, said valve element being movable outwardly by centrifugal force to establish communication between said ports, said valve element having a part thereof subject to fluid pressure developed in said discharge port and movable in response thereto to cause said valve element to close said supply port, the pressure in said discharge port increasing in three stages in accordance with increasing speed to rotation of said rotatable member, said assembly including first and second weight members, a first spring member between said valve element and said first weight member, a second spring member between said valve element and said second weight member, said first and second spring members assisting centrifugal force on said valve element and said first and second weight members in the first and second stages of pressure rises, first stop means for arresting outward movement of said first weight member at the end of said first stage so that said first spring member exerts a constant force on said valve element, second stop means for arresting outward movement of said second weight member at the end of said second stage so that said second spring member exerts an additional constant force on said valve element, fluid pressure acting on said valve part of said valve element being effective to counteract the combined constant forces of said spring members and the centrifugal force of said valve member and to alone determine pressure rise in said third stage, said first and second spring members comprise coil springs in telescoping relation surrounding said weight members, and said first spring member is located between said valve element and said first weight member and said second spring member is located between said valve element and said second weight member.

2. An hydraulic governor as defined in claim 1 wherein said first and second weight members have stem portions, the stem portion of said second weight member being slidably received within the valve member and the stem portion of said first weight member being slidably received within said second weight member.

* * * * *

UNITED STATES PATENT OFFICE
CERTIFICATE OF CORRECTION

PATENT NO. : 3,943,956
DATED : March 16, 1976
INVENTOR(S) : RICHARD HILLS

It is certified that error appears in the above-identified patent and that said Letters Patent are hereby corrected as shown below:

Column 4, line 52 change "to rotation" to -- of rotation --.

Signed and Sealed this twenty-fifth Day of May 1976

[SEAL]

Attest:

RUTH C. MASON
Attesting Officer

C. MARSHALL DANN
Commissioner of Patents and Trademarks